United States Patent
Lull et al.

(10) Patent No.: US 10,642,269 B2
(45) Date of Patent: May 5, 2020

(54) VEHICLE LOCALIZATION SYSTEM

(71) Applicant: DENSO International America, Inc., Southfield, MI (US)

(72) Inventors: Joseph Lull, South Haven, MI (US); Shawn Hunt, Pinckney, MI (US)

(73) Assignee: DENSO International America, Inc., Southfield, MI (US)

( * ) Notice: Subject to any disclaimer, the term of this patent is extended or adjusted under 35 U.S.C. 154(b) by 264 days.

(21) Appl. No.: 15/860,973

(22) Filed: Jan. 3, 2018

(65) Prior Publication Data

US 2019/0204831 A1 Jul. 4, 2019

(51) Int. Cl.
*G05D 1/00* (2006.01)
*G05D 1/02* (2020.01)

(52) U.S. Cl.
CPC ......... *G05D 1/0088* (2013.01); *G05D 1/0231* (2013.01); *G05D 1/0255* (2013.01)

(58) Field of Classification Search
CPC .................................................. G05D 1/0088
See application file for complete search history.

(56) References Cited

U.S. PATENT DOCUMENTS

| | | | | |
|---|---|---|---|---|
| 8,660,355 | B2 * | 2/2014 | Rodriguez | G06K 9/00973 382/118 |
| 9,202,254 | B2 * | 12/2015 | Rodriguez | H04W 4/50 |
| 9,842,496 | B1 * | 12/2017 | Hayward | G01S 19/50 |
| 10,134,421 | B1 * | 11/2018 | Sundaram | G10L 17/04 |
| 10,241,509 | B1 * | 3/2019 | Fields | A61B 5/4094 |
| 10,445,597 | B2 * | 10/2019 | Jackson | G06K 9/00805 |
| 2008/0137908 | A1 * | 6/2008 | Stein | G06K 9/00818 382/103 |
| 2011/0109476 | A1 * | 5/2011 | Porikli | G06K 9/00818 340/905 |
| 2013/0079990 | A1 * | 3/2013 | Fritsch | B62D 6/007 701/41 |
| 2017/0140478 | A1 * | 5/2017 | Freeman | G06Q 50/02 |
| 2017/0153714 | A1 * | 6/2017 | Gao | G06F 3/017 |
| 2017/0174227 | A1 * | 6/2017 | Tatourian | G06K 9/00805 |
| 2017/0220874 | A1 * | 8/2017 | Ayvaci | G06T 7/13 |
| 2018/0068206 | A1 * | 3/2018 | Pollach | G06K 9/00791 |
| 2018/0197355 | A1 * | 7/2018 | Remboski | G07C 5/0808 |
| 2018/0216958 | A1 * | 8/2018 | Park | B60W 10/04 |
| 2018/0217254 | A1 * | 8/2018 | Hong | H01Q 1/32 |
| 2018/0218606 | A1 * | 8/2018 | Michalakis | G05D 1/0234 |
| 2018/0257682 | A1 * | 9/2018 | Brooks | B61L 3/006 |
| 2018/0376305 | A1 * | 12/2018 | Ramalho de Oliveira | H04W 4/44 |
| 2019/0163982 | A1 * | 5/2019 | Block | G06K 9/6277 |

FOREIGN PATENT DOCUMENTS

JP 2007309832 A 11/2007
JP 2016061570 A 4/2016

* cited by examiner

Primary Examiner — Alex C Dunn

(57) ABSTRACT

A method for localizing and navigating a vehicle on underdeveloped or unmarked roads. The method includes: gathering image data with non-hyperspectral image sensors and audio data of a current scene; classifying the current scene based on the gathered image data and audio data to identify a stored scene model that most closely corresponds to the current scene; and setting spectral range of hyperspectral image sensors based on a spectral range used to capture a stored scene model that most closely corresponds to the current scene.

15 Claims, 2 Drawing Sheets

VEHICLE LOCALIZATION SYSTEM

FIELD

The present disclosure relates to vehicle localization and navigation on underdeveloped and unmarked roads.

BACKGROUND

This section provides background information related to the present disclosure, which is not necessarily prior art.

When resources were abundant and inexpensive, cities and states built roads to virtually everywhere because drivers desired a clearer and smooth driving area that was gentler on tires and vehicle suspensions. Due to changing perspectives on resource management and economic transformations, many transportation agencies (local, state, and federal) are reverting numerous roads back to their original unpaved condition. Thus vehicles, particularly autonomous vehicles, will need to operate on unpaved roads or urban and rural two-track dirt roads (roads that are created by repeated driving over the same path or two-track as pertaining to the path left by a wheeled vehicle). Unpaved roads and two-track driving spaces provide a unique challenge to automated vehicles with systems designed to localize off distinct road surfaces and lane markings. The renaissance of unpaved roads and the need for special vehicles to traverse forest or fire service roads, or even pastures and farmlands, presents the need for a new generation of systems and methods for localizing and navigating a vehicle on underdeveloped and unmarked roads. The present teachings advantageously provide for such methods and systems for localizing and navigating a vehicle on underdeveloped and/or unmarked roads, as described in detail herein.

SUMMARY

This section provides a general summary of the disclosure, and is not a comprehensive disclosure of its full scope or all of its features.

The present disclosure provides for a method for localizing and navigating a vehicle on underdeveloped or unmarked roads. The method includes: gathering image data with non-hyperspectral image sensors and audio data of a current scene; classifying the current scene based on the gathered image data and audio data to identify a stored scene model that most closely corresponds to the current scene; and setting spectral range of hyperspectral image sensors based on a spectral range used to capture a stored scene model that most closely corresponds to the current scene.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
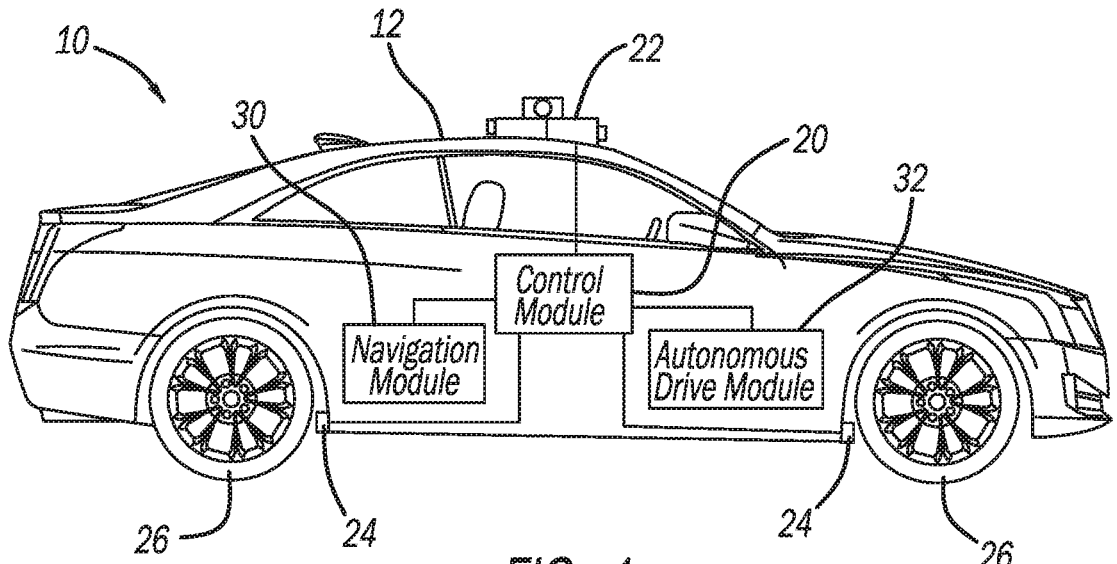
FIG. 1 illustrates an exemplary vehicle including a system in accordance with the present disclosure for localizing and navigating underdeveloped and unmarked roads.

FIG. 1 illustrates a system 10 in accordance with the present teachings for localizing and navigating a vehicle 12, such as on undeveloped and/or unmarked roads (e.g., two-track dirt roads, unpaved roads, pastures, farmlands, etc.). FIG. 1 illustrates the vehicle 12 as a passenger vehicle, however, the system 10 can be included with any other suitable vehicle, machinery, or equipment. For example, the system 10 can be installed in any suitable mass transit vehicle, emergency vehicle, military vehicle, agricultural equipment, recreational vehicle, police vehicle, etc.

The system 10 includes a control module 20, which is in receipt of data inputs from one or more image sensors of an image sensor assembly 22, one or more audio sensors 24. The control module 20 is in communication with a navigation module 30 and an autonomous drive module 32. The control module 20, navigation module 30, and autonomous drive module 32 can be mounted at any suitable location about the vehicle 12.

The term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules, controllers, and systems described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The image sensor assembly 22 includes non-hyperspectral and hyperspectral image sensors. The non-hyperspectral image sensors can include any low-bandwidth sensors suitable to perform coarse scene recognition of the environment about the vehicle 10. The spectral bandwidth of the hyperspectral image sensors can be advantageously reduced as described herein to decrease processing and response times, and conserve processing power, for example. The hyperspectral image sensors can include any suitable camera(s) or other sensor(s) suitable for capturing at least one of the following spectral ranges: visible range (400-705 nm); near infrared (750-1,400 nm); short wave infrared (1,400-3,000 nm); medium wave infrared (3,000-8,000 nm); long wave infrared 8,000-15,000 nm); and far infrared (15,000 to 1*10^6 nm). The image sensor assembly 22 can be mounted at any suitable position about the vehicle 12, such as at a roof thereof as illustrated in FIG. 1. Data captured by the image sensors of the image sensor assembly 22 can be input to the control module 20 in any suitable manner, such as by any suitable hardwire connection.

The audio sensors 24 can be any suitable microphones or other devices suitable for capturing audible interaction between the wheels 26 of the vehicle 12 and the terrain (e.g., paved roads, unpaved roads, rural two-track dirt roads, farmland, pastures, or any other underdeveloped or unmarked roads) that the vehicle 12 is traveling across. The audio sensors 24 can be arranged at any suitable position about the vehicle 12, such as at wheel wells for the wheels 26. Use of the audio sensor 24 advantageously facilitates classification of the current scene, as described herein.

Figure 2:
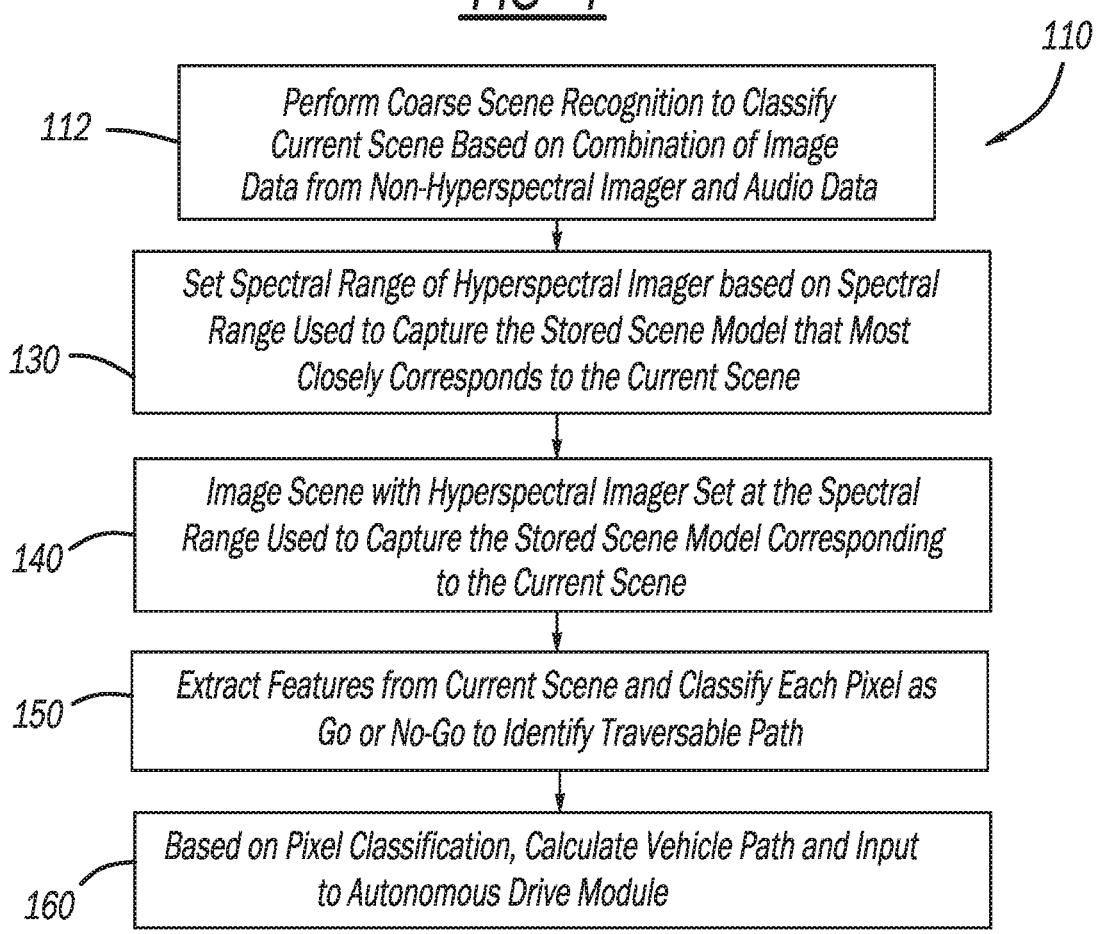
FIG. 2 illustrates features of the system for localizing and navigating underdeveloped and unmarked roads.

With continued reference to FIG. 1, and additional reference to FIGS. 2 and 3, operation of the system 10 will now be described. Specifically, FIG. 2 illustrates a method 110 in accordance with the present teachings for localizing and navigating a vehicle, such as the exemplary vehicle 12, on underdeveloped or unmarked roads. Although the method 110 is described as being performed by the system 10, the method 110 can be performed by any other suitable system for localizing and navigating a vehicle on underdeveloped or unmarked roads as well. With reference to block 112 of FIG. 2, the control module 20 is configured to perform coarse scene recognition to classify the current scene about the vehicle 12 based on the image data captured by the non-hyperspectral image sensors of the image sensor assembly 22 and the audio data captured by the audio sensors 24. This classification of the current scene is described in greater detail in FIG. 3.

Figure 3:
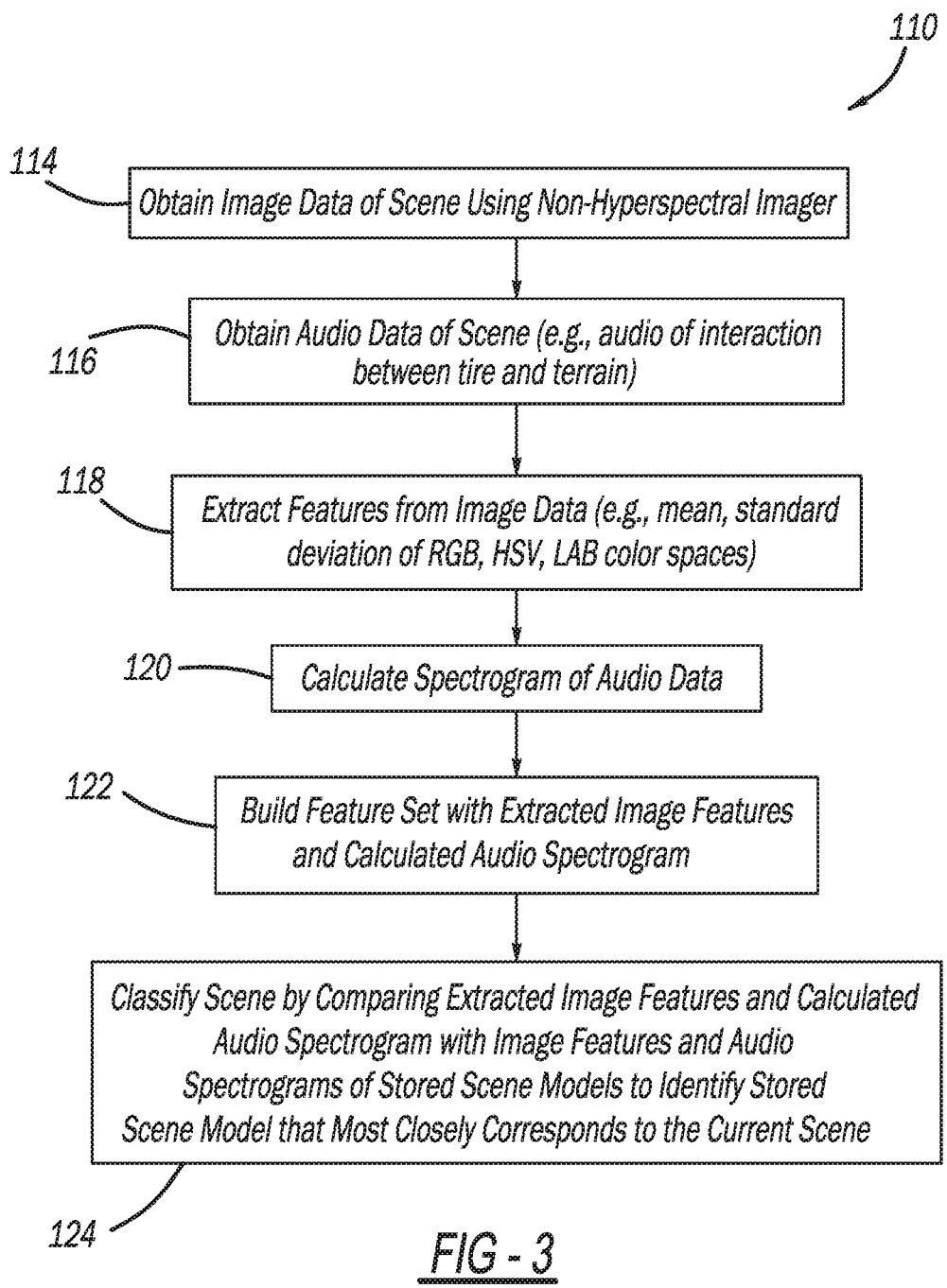
FIG. 3 illustrates scene classification based on image data and audio data in accordance with the present disclosure.

With reference to block 114 of FIG. 3, the control module 20 obtains image data of the scene about the vehicle 12 using the non-hyperspectral image sensors of the image sensor assembly 22. The non-hyperspectral image sensors capture image data of the scene, and input the data to the control module 20 through any suitable connection, such as any suitable hardwire or wireless connection. Any suitable image data can be captured by the non-hyperspectral image sensors, such as image data including the features set forth in block 118 described below. From block 114, the method 110 proceeds to block 116. At block 116, the control module 20 obtains audio data of the scene, particularly audio data of interaction between one or more of the wheels 26 and the terrain that the vehicle 12 is traveling across (e.g., paved roads, unpaved roads, rural two-track dirt roads, farmland, pastures, or any other underdeveloped or unmarked roads). The audio data captured by the audio sensors 24 is input to the control module 20 by way of any suitable connection, such as any suitable hardwire or wireless connection. From block 116, the method 110 proceeds to block 118.

At block 118, the control module 20 extracts any suitable features from the image data captured by the non-hyperspectral image sensors suitable for classifying the current scene. For example, the control module 20 can extract mean and standard deviation of RGB (red, green, blue), HSV (hue, saturation, value), and LAB colorspaces of the image data of the current scene. At block 120, the method 110 calculates a spectrogram of the audio data captured by the audio sensors 24 of the wheel-terrain interaction. Then at block 122, the control module 20 builds a feature set of the current scene based on the extracted image features (see block 118) and the calculated audio spectrogram (see block 120).

From block 122, the method 110 proceeds to block 124. At block 124, the control module 20 classifies the current scene by comparing the extracted image features and the audio spectrogram with image features and audio spectrograms of stored scene models to identify a stored scene model that most closely corresponds to the current scene. The scene models can be stored at the control module 20, or at any other suitable location. Any suitable number of scene models of any suitable number of various different scenes can be stored. For example, one or more scene models of the following scene conditions may be stored: whiteout conditions; dense foliage; standing water; fog; rain; etc.

Once the current scene has been classified as one of the stored scene models, the method 110 proceeds to block 130 of FIG. 2. At block 130, the control module 20 sets the spectral range of the hyperspectral image sensors of the image sensor assembly 22 based on a spectral range used to capture the stored scene model that the control module 20 determined to most closely correspond to the current scene at blocks 112-124. For example, when the control module 20 classifies the current scene as corresponding to a stored scene model of whiteout conditions, the control module 20 will set the spectral range of the hyperspectral image sensors to be in the range of 1350-1450 nanometers, which is a spectral range known to be effective for imaging a scene of whiteout conditions. If the control module 20 determines that the current scene most closely corresponds to a stored scene model of dense foliage, the control module 20 will set the spectral range of the hyperspectral image sensors to be in the range of 650-750 nanometers, which is known to be effective for imaging scenes including dense foliage. If the control module 20 classifies the current scene as corresponding to a stored scene of standing water, the control module 20 will set the spectral range of the hyperspectral image sensors to be in the range of 800-2500 nanometers, which is known to be effective for imaging scenes of standing water.

From block 130, the method 110 proceeds to block 140. At block 140, the control module 20 operates the hyperspectral image sensors of the image sensor assembly 22 to image the current scene at the spectral range used to capture the stored scene model determined by the control module 20 to most closely correspond to the current scene. From block 140, the method 110 proceeds to block 150. At block 150, the control module 20 extracts features of the current scene and classifies each pixel of the current scene as "go" or "no-go" to identify a traversable path for the vehicle 10. For example, if a particular pixel is of thick brush or a tree, the control module 20 will classify the pixel as a "no-go." If a particular pixel is of a track of a two-track dirt road, the control module 20 will classify the pixel as a "go." Once each pixel is so classified, the method 110 proceeds to block 160. At block 160, the control module 20 cooperates with the navigation module 30 to determine the best path for the vehicle 10 based on the pixel classification at block 150. The control module 20 then inputs the path to the autonomous drive module 32, which operates the vehicle 10 to follow the path, such as along a two-track road. The navigation module 30 is thus configured to plot a best path for the vehicle 10 based on the classified "go" and "no-go" pixels. The autonomous drive module 32 is configured to autonomously operate the vehicle to follow the path.

The present disclosure provides numerous advantages. For example, the present disclosure advantageously uses low-bandwidth non-hyperspectral image sensors to identify the spectral range of hyperspectral image sensors 22 most suitable for imaging the current scene. This eliminates imaging by the hyperspectral image sensors outside of the set spectral range, thereby reducing the amount of data that must be processed by the control module 20 to image the scene (such as at block 140). This advantageously reduces the processing burden on the control module 20, and increases the response time of the control module 20. Thus scenes can be imaged faster at block 140, and the best route can be calculated faster as well, thereby improving operational safety and response time. Use of both image data and audio data further improves classification accuracy of the current scene.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for localizing and navigating a vehicle on underdeveloped or unmarked roads, the method comprising:
    gathering image data with non-hyperspectral image sensors and audio data of a current scene;
    classifying, using a processor, the current scene based on the gathered image data and audio data to identify a stored scene model that most closely corresponds to the current scene;
    setting spectral range of hyperspectral image sensors based on a spectral range used to capture a stored scene model that most closely corresponds to the current scene;
    imaging the current scene with the hyperspectral image sensors set at the spectral range used to capture the stored scene model that most closely corresponds to the current scene; and
    plotting a route for the vehicle based on images of the current scene captured by the hyperspectral image sensors set at the spectral range used to capture the stored scene model that most closely corresponds to the current scene.

2. The method of claim 1, wherein gathering audio data includes gathering audio data of interaction between wheels of the vehicle and terrain that the vehicle is traveling over.

3. The method of claim 2, further comprising calculating a spectrogram of the audio data.

4. The method of claim 1, further comprising extracting features from the image data gathered with the non-hyperspectral image sensors, including mean and standard deviation of RGB (red, green, blue), HSV (hue, saturation, value), and LAB colorspaces of the image data of the current scene.

5. The method of claim 1, further comprising building a feature set of the current scene including image features extracted from the image data, and calculating a spectrogram of the audio data.

6. The method of claim 5, wherein the classifying the current scene includes comparing the extracted image features and the spectrogram of the audio data with a plurality of different stored scene models, and identifying the stored scene model of the plurality of different stored scene models that most closely corresponds to the current scene.

7. The method of claim 1, further comprising classifying each pixel of the images of the current scene captured by the hyperspectral image sensors as "go" or "no-go" for the vehicle, and plotting the route for the vehicle based on the classification of each pixel.

8. A system for localizing and navigating a vehicle on underdeveloped or unmarked roads, the system comprising:
- a non-hyperspectral image sensor for gathering image data of a current scene about the vehicle;
- an audio sensor for gathering audio data of the current scene about the vehicle;
- a control module in receipt of the image data and the audio data of the current scene, the control module configured to:
  - classify the current scene based on the gathered image data and audio data to identify a stored scene model that most closely corresponds to the current scene;
  - set spectral range of a hyperspectral image sensor based on a stored spectral range used to capture the stored scene model that most closely corresponds to the current scene;
  - image the current scene with the hyperspectral image sensor set at the stored spectral range used to capture the stored scene model that most closely corresponds to the current scene; and
  - plot a route for the vehicle based on images of the current scene captured by the hyperspectral image sensor set at the spectral range used to capture the stored scene model that most closely corresponds to the current scene.

9. The system of claim 8, wherein the hyperspectral image sensor is configured to capture at least one of the following spectral ranges: visible range (400-705 nm); near infrared (750-1,400 nm); short wave infrared (1,400-3,000 nm); medium wave infrared (3,000-8,000 nm); long wave infrared 8,000-15,000 nm); and far infrared (15,000 to 1*10^6 nm).

10. The system of claim 8, wherein the audio sensor includes at least one microphone.

11. The system of claim 10, wherein the at least one microphone includes a plurality of microphones mounted proximate to wheels of the vehicle to hear interaction between the wheels and underlying terrain.

12. The system of claim 8, wherein the control module is further configured to calculate a spectrogram based on the audio data.

13. The system of claim 8, wherein the control module is further configured to build a feature set of the current scene including image features extracted from the image data and a spectrogram of the audio data.

14. The system of claim 13, wherein the control module is further configured to classify the current scene by comparing the extracted image features and the spectrogram of the audio data with a plurality of different stored scene models, and identify the stored scene model of the plurality of different stored scene models that most closely correspond to the current scene.

15. The system of claim 8, further comprising classifying each pixel of the images captured by the hyperspectral image as "go" or "no-go" for the vehicle to travel, the navigation module plots the route based on the classification.

* * * * *